March 16, 1926.                      1,576,794
W. SASSE
DRILLING TOOL
Filed July 7, 1925
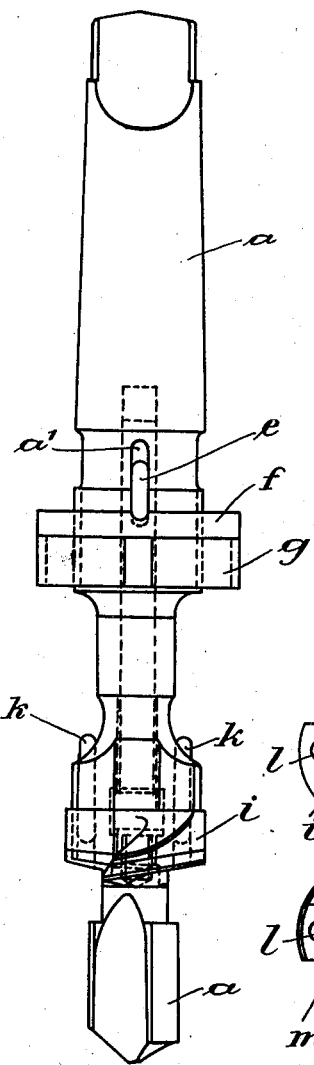
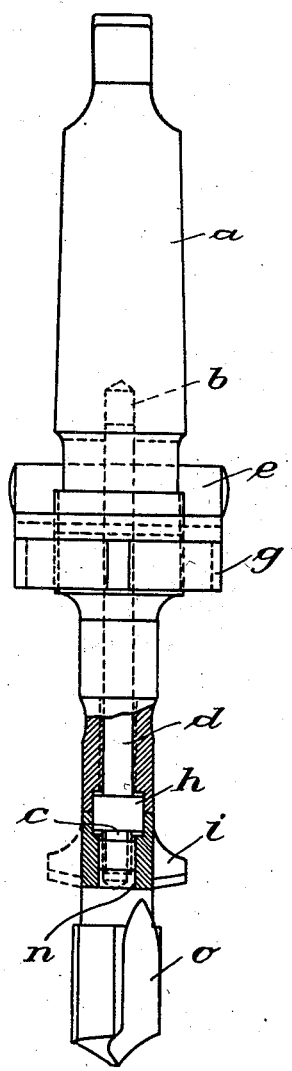
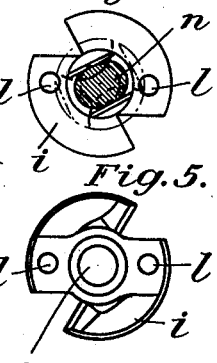
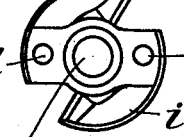
INVENTOR
Wilhelm Sasse
By Richards & Geier
Attys.

Patented Mar. 16, 1926.

1,576,794

UNITED STATES PATENT OFFICE.

WILHELM SASSE, OF SPANDAU, GERMANY.

DRILLING TOOL.

Application filed July 7, 1925. Serial No. 41,953.

*To all whom it may concern:*

Be it known that I, WILHELM SASSE, a citizen of the German realm, residing at Spandau, Germany, have invented certain new and useful Improvements in Drilling Tools, of which the following is a specification.

This invention relates to drilling tools and more particularly to tools of this kind having a disc-shaped drilling cutter and a tool holder which effects the rotation of the former, said holder serving for fastening the drilling tool to the spindle of a boring machine.

Constructions are known, whereby milling cutters for the purpose of making a depression are fastened to and at the same time centrally adjusted with the holder, which is inserted into the spindle of the drilling machine, said fastening and adjusting of the milling cutter being accomplished by means of an anchoring bolt introduced into an axial bore of said holder.

According to this invention there is also used an anchoring bolt of the kind mentioned, the novel bolt, however, having the particular effect that it will not only serve as a connection between the holder and the drilling cutter, but also as a carrier for detachably holding the advance cutter or guiding pivot, which is arranged in front of the drilling cutter proper. In addition to this the anchoring bolt according to this invention is constructed to serve as a means for securing the advance cutter in a definite position relatively to the drilling cutter against independent rotation, for the purpose of providing a path between the interstices of the drilling cutter, through which the cuttings may be carried off.

In the drawing an example of the drilling tool according to this invention is represented, Fig. 1 showing the tool and its connection with the tool holder and the advance cutter in a latertal view, Fig. 2 showing the tool as represented in Fig. 1 in a lateral view perpendicular to that of Fig. 1, Fig. 3 being a plan view of the advance cutter, Fig. 4 a bottom view of the drilling cutter together with the guiding pivot of the advance cutter engaging a depression, said pivot being shown in shaded lines, and Fig. 5 a top view of the drilling cutter.

As shown in particular in Fig. 2 the holder $a$, which is intended to be fastened to the spindle of the drilling machine, is provided with an axial bore $b$, said bore serving for the reception of the anchoring bolt $d$, which is provided at its under end with a threaded pivot $c$. In proximity to the upper end of the anchoring bolt $d$ there is provided a transverse slot passing through said bolt, said slot serving for the reception of a flat key or arbor $e$. The key $e$ passes through a transverse slot $a^1$ which is provided at a proper height in the holder $a$ and rests with its outwardly projecting ends upon a disc or washer $f$, which as shown especially in Fig. 1 is provided with radially directed grooves for this purpose. The washer $f$ is carried by an annular nut $g$ which may be screwed upon a threaded part of the holder $a$.

The anchoring bolt $d$ is equipped at its lower end immediately in front of the threaded pivot $c$ with a collar $h$, which at its upper end exactly fits into a correspondingly enlarged part of the axial bore of the holder. At the same time said collar $h$ engages with its lower part, which projects from the bore of the holder, a bore of exactly the same diameter provided in the drilling cutter $i$ for centrally adjusting the latter with respect to the tool holder.

The two driving pins $k$ pass through the upper part of the tool holder and at their lower ends project into corresponding holes $l$ in the drilling cutter $i$, whereby the latter will be secured against independent rotation.

In the example of the drilling tool, as represented in the drawing, the central bore $m$ of the drilling cutter is of oval cross-sectional configuration in order to receive the oval guiding pivot $n$ of the advance cutter and to secure the latter in such a position against unintended rotation, that the cuttings produced from the hole, which is being drilled by the advance cutter, will be enabled to pass through the free spaces of the drilling cutter $i$ in upward direction. Instead of the oval cross-sectional configuration of the central bore $m$ and the guiding pivot $n$ other non-circular cross-sections may also be employed.

In case of drilling cutters of especially large diameters it will be necessary to replace the drill by a guiding pivot, which is made to fit a smaller hole to be drilled by an especial drilling tool. This guiding pivot in this case must also be provided with a non-circular holding pivot exactly the same as the advance cutter $o$ and carry a threaded bore which is required for the reception of the threaded pivot c of the anchoring bolt d.

If it is desired to employ the drilling cutter i together with an advance cutter o, the drilling cutter i is first mounted upon the holding pivot n of the advance cutter o, thereupon the pivot n is screwed upon the threaded pivot c of the anchoring bolt d. Thereupon the anchoring bolt is inserted into the axial bore of the holder and protected against falling off by the transverse key e. By now unscrewing the nut g in upward direction the advance cutter o and the drilling cutter i are, by means of the anchoring bolt d, drawn tight against each other as well as against the under end of the holder, so that a rigid unit will be obtained, of which the several parts may be very quickly assembled, separated or exchanged with others.

I claim:

1. A drilling tool comprising disc-shaped drilling cutter, a holder for said drilling cutter, an anchoring bolt inserted into an axial bore of said holder and having a collar for detachably securing said drilling cutter to said holder in a central position therein, a key and a nut provided on said anchoring bolt for fastening the latter to said holder, an advance cutter fastened to said anchoring bolt, said advance cutter being of non-circular cross-sectional configuration and engaging a similar bore in said drilling cutter.

2. A drilling tool comprising a disc-shaped drilling cutter, a holder for said drilling cutter, an anchoring bolt inserted into an axial bore of said holder and having a collar for detachably securing said drilling cutter to said holder in a central position therein, a key and a nut provided on said anchoring bolt for fastening the latter to said holder, a threaded pivot on said anchoring bolt, an advance cutter engaging said threaded pivot, said advance cutter being provided with a non-circular pivot, and a bore in said drilling cutter, said bore being adapted for engagement with said non-circular pivot.

In testimony whereof I affix my signature.

WILHELM SASSE.